(No Model.) 2 Sheets—Sheet 1.
A. HUNTER.
TRICYCLE.
No. 483,495. Patented Sept. 27, 1892.
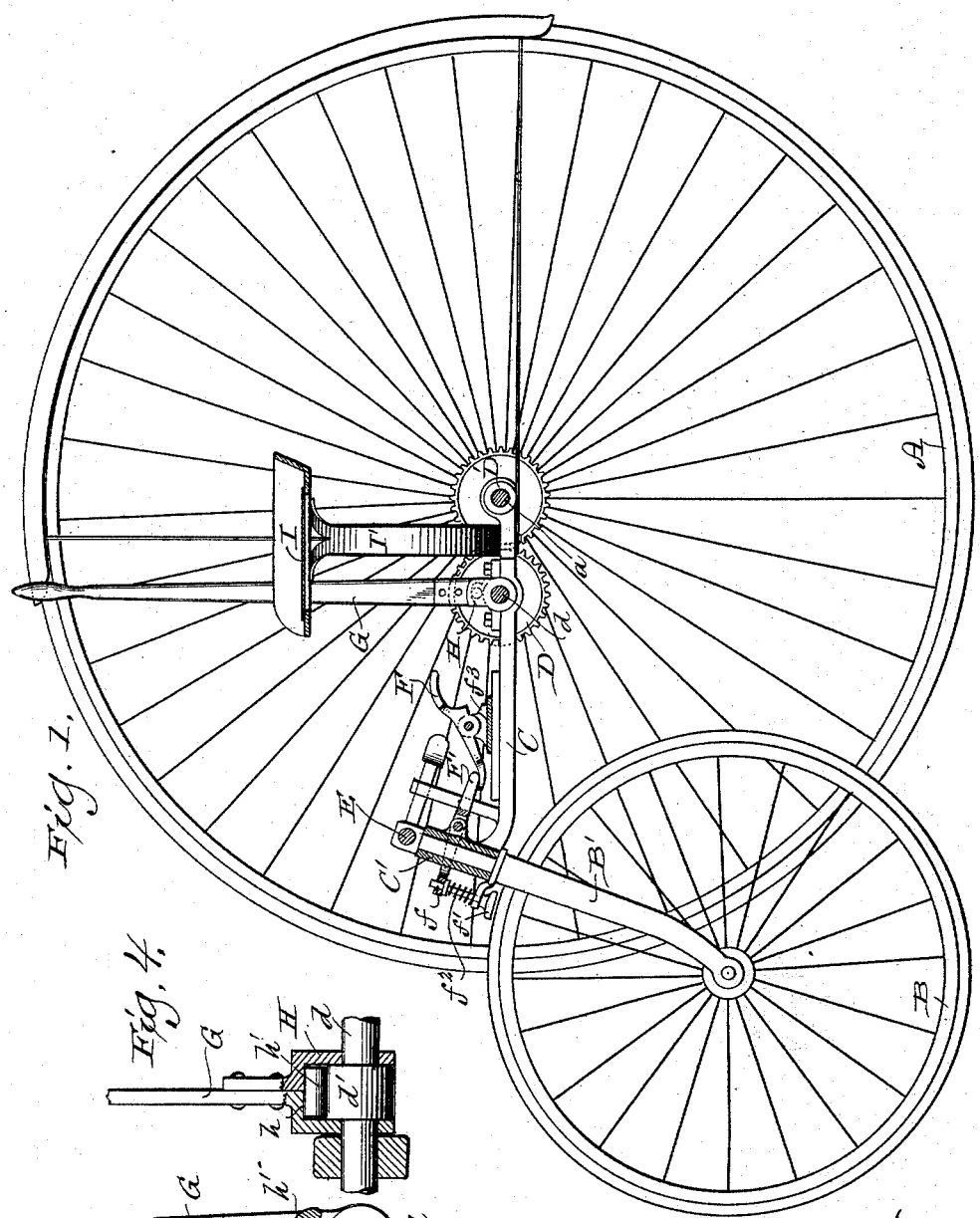
Witnesses
Geo. W. Young,
John E. Wiles.
Inventor
Andrew Hunter.
By H.G. Underwood
Attorney

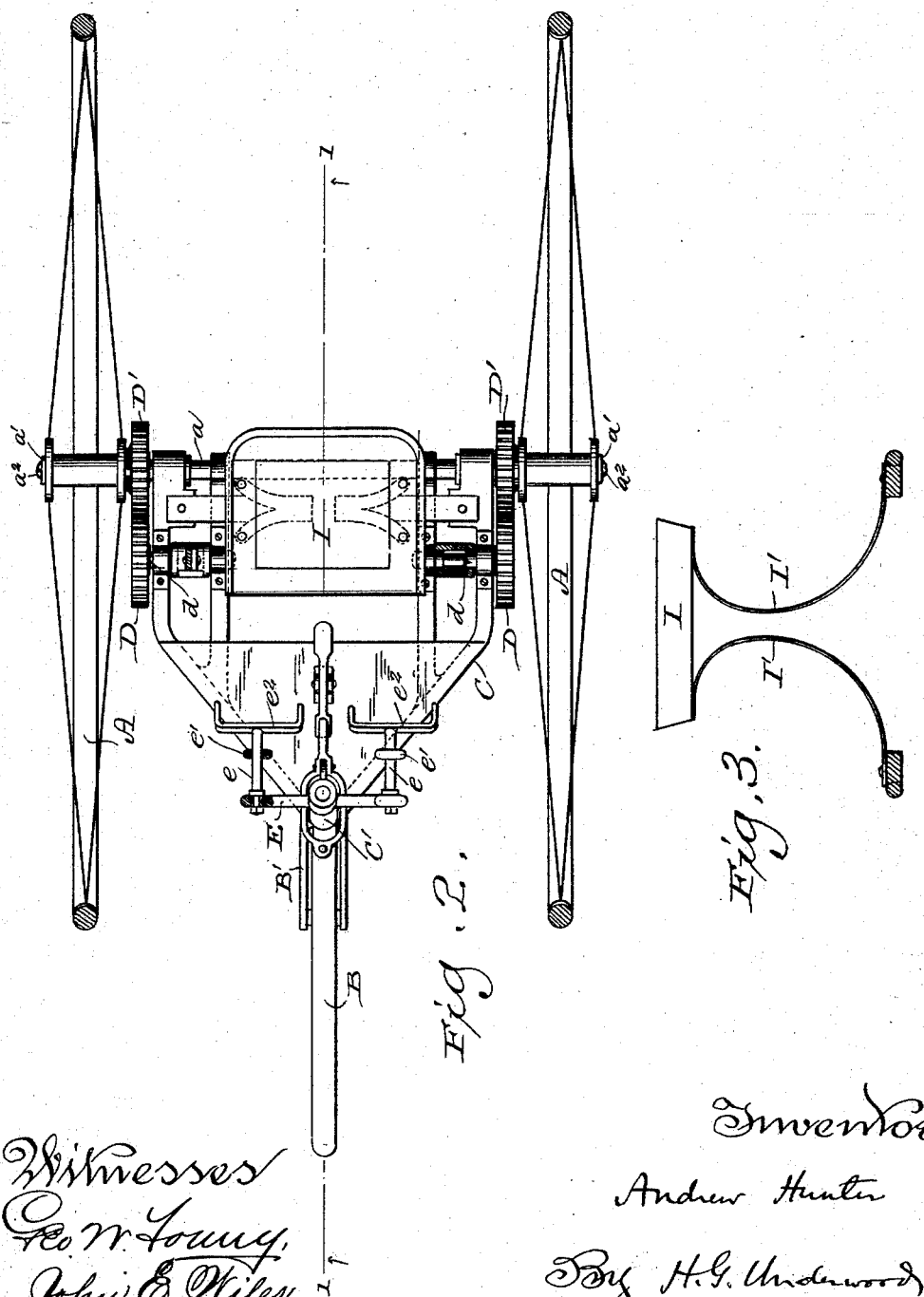

UNITED STATES PATENT OFFICE.

ANDREW HUNTER, OF CHICAGO, ILLINOIS, ASSIGNOR OF ONE-HALF TO JOHN W. WARD, OF POSTVILLE, IOWA.

TRICYCLE.

SPECIFICATION forming part of Letters Patent No. 483,495, dated September 27, 1892.

Application filed November 23, 1891. Serial No. 412,778. (No model.)

*To all whom it may concern:*

Be it known that I, ANDREW HUNTER, a citizen of the United States, and a resident of Chicago, in the county of Cook, and in the State of Illinois, have invented certain new and useful Improvements in Tricycles; and I do hereby declare that the following is a full, clear, and exact description thereof.

My invention relates to new and useful improvements in tricycles; and it consists of certain peculiarities of construction and arrangement of parts, as will be hereinafter described, and pointed out in the appended claims.

In the accompanying drawings, illustrating my invention, Figure 1 is a longitudinal vertical section of a tricycle embodying my invention, said section being taken on line 1 1 of Fig. 2. Fig. 2 is a top plan view of the same. Fig. 3 is a detail view illustrating the arrangement of the seat and seat-springs. Figs. 4 and 5 are detail views showing clutch-and-lever mechanism for communicating motion to the drive-shaft.

In the drawings, A A represents the large or driving wheels of a tricycle, and B the steering-wheel.

C is any suitable or desired form of frame, in which is supported the axle $a$, upon which the two wheels A A are loosely mounted, and provided with a "head" C', within which is revolubly secured the bifurcated support B' for the steering-wheel B.

The driving mechanism for communicating motion to the wheels A A comprises one or more gears located upon shafts extending parallel with the axle $a$ and any suitable lever-and-clutch mechanism for producing a rotary movement of said shafts.

I provide upon the upper end of the bifurcated support B a cross-arm E and two movably-supported push rods or bars $e$ $e$, engaged with the extremities of said cross-arm and having sliding engagement with suitable standards $e'$ $e'$ upon the frame of the machine. The rear ends of said push-rods extend into a position such as will bring them within easy reach of the rider's feet and, if desired, may be provided with suitable foot-pieces $e^2$ $e^2$.

Any suitable brake mechanism may be provided for engaging with the periphery of the wheel B, that illustrated in the drawings consisting of a lever F, pivotally supported upon the frame in a position convenient to the foot of the rider and adapted to engage at its forward end beneath the rear end of a pivoted lever F', to the outer or forward end of which is connected the brake-rod or plunger $f$, carrying at its lower end the brake-shoe $f'$, which engages with the tire of the wheel B. A spring $f^2$ is conveniently arranged upon the rod $f$ between a projecting guide-bracket on the head and an annular shoulder on said rod and serves to normally hold the brake out of engagement with the tire of the wheel B. By this construction a downward pressure on the rear end of the lever F will obviously serve to move the brake-shoe $f'$ into engagement with the wheel B, and upon the release of said foot-lever the spring $f^2$ will immediately raise the brake, so as to permit said wheel to run freely, the levers F and F' being thereby returned to their normal positions.

The form of driving mechanism illustrated in the drawings comprises two gear-wheels D D, located upon transverse shafts $d$ $d$ and adapted for engagement with gears D' D' on the inner ends of the hubs of the drive-wheels A A. One or more levers G G are revolubly secured to the shafts $d$ $d$, and a friction-clutch, ratchet and pawl, or any other equivalent form of device may be provided upon each shaft for giving a rotary movement to said shaft when the lever is vibrated rearwardly and permitting a free rotation of said shaft when the lever is held stationary or vibrated forward.

The particular form of device illustrated in the drawings is a friction-clutch comprising a housing H, secured to the lower end of the lever G and revolubly engaged with the shaft, said housing being provided with an inclined or eccentric bearing-surface $h$, and a roller $h'$, located within said housing and resting between said eccentric bearing-surface and an annular shoulder $d'$ on said shaft. Any equivalent clutch device may obviously be employed, if desired, instead of the form shown.

I prefer to provide the seat I with spring-supports I' I', which are conveniently made from flat strips of spring metal engaged with the under surface of said seat and preferably bifurcated at their upper ends, said spring-supports being also preferably curved inwardly at their central portions and curved outwardly at their lower ends and attached to the frame of the machine. This form of construction affords a very elastic support for the seat. I also prefer to locate the seat-supports slightly in advance of the axle $a$ of the wheels A A, so as to avoid any tendency of the machine to tip backward.

It will be observed that by the herein-described form of lever-and-clutch mechanism for rotating the shafts $d\,d$ and gears D D, the levers may be operated simultaneously or alternately, as may be desired, said clutch mechanism being adapted to grip the annular collar or shoulder on the shaft instantaneously upon a backward movement of the lever.

The relative sizes of the gears D D and D' D' may be varied, as desired, to produce any desired speed of rotation of the wheels A A with a given movement of the levers.

By my improved construction I am enabled to propel the vehicle at a very rapid rate of speed with a very slight expenditure of power on the part of the rider, inasmuch as the length of the levers G G will afford much greater driving-power with a very slight exertion on the part of the rider than could be obtained by the ordinary form of cranks provided with pedals. If greater speed is desired, I locate a larger driving-gear upon the shaft or axle $a$, or if less speed and a greater power is desired to propel the vehicle without severe exertion on the part of the rider the larger gear will be located upon the axle $a$ and the smaller gear upon the shaft $d$. In this manner the degree of speed attained by the machine in proportion to the power employed to propel it may be varied as may be desired.

In order to effect a speedy interchange of the gears D D and D' D', as before described, I extend the ends of the shafts $d\,d$ beyond their bearings in the frame and locate the gears D D upon said projecting ends in such a manner as to be readily removed, while the gears D' D' are located upon the inner ends of the limbs of the wheels A A, and said wheels A A are removably secured upon the ends of axle $a$ in any suitable or desired manner—as, for instance, by means of collars $a'\,a'$, secured upon the ends of the shaft $a$ by means of screws $a^2\,a^2$.

As a further and separate improvement and in order to prevent the brake from being too forcibly applied upon the tire of the wheel B, I provide upon the frame of the machine a suitable stop $f^3$, arranged in the path of the lever F and adapted to limit its movement, thereby serving to prevent a too forcible application of the brake and consequent severe wear or strain on the tire of the wheel B.

My improved form of tricycle is very simple in its construction, cheap to manufacture, durable, and effective in its operation.

I would have it understood that I do not desire to limit myself to the exact form of construction shown in the drawings and herein described, as various modifications in the details of construction may be obviously made without departing from my original invention.

Having described my invention, what I claim is—

1. A vehicle comprising one or more driving-wheels, a steering-wheel journaled in a revoluble bifurcated support provided at its upper end with a cross arm or bar, and bars or rods slidingly engaged with the frame and having their forward ends engaged with the extremities of said cross arm or bar, substantially as and for the purpose described.

2. The combination, with the frame and wheels of a vehicle, of a brake mechanism comprising a brake-shoe adapted to engage with one of said wheels, a rod extending from said shoe and engaged with a lever pivotally secured upon the frame, and a second lever pivotally engaged with the frame of the machine and adapted to be operated by the foot of the rider to apply the brake, substantially as described.

3. The combination, with the frame and wheels of a vehicle, of a brake mechanism comprising a brake-shoe adapted to engage with one of said wheels, a rod extending from said shoe and engaged with a lever pivotally secured upon the frame, a second lever pivotally engaged with the frame of the machine and adapted to be operated by the foot of the rider to apply the brake, and a stop for limiting the movement of the last-mentioned lever, substantially as described.

4. The combination, with the frame and wheels of a vehicle, of a seat provided with elastic supports curved inwardly below their points of engagement with said seat and curved outwardly at their lower ends and engaged with the frame, substantially as described.

5. In a tricycle, the combination, with a suitable frame, of a transverse axle engaged with suitable supports in said frame, drive-wheels removably secured upon the axle outside of said supports, gear-wheels secured upon the inner ends of the hubs of said drive-wheels, shafts extending parallel with said axle and journaled in bearings on the frame, driving-gears removably secured upon said shafts outside of said bearings, and levers carrying clutch mechanism for giving a rotary motion to said shafts, substantially as described.

6. The combination, with the frame, the drive-wheels, and the steering-wheel of a tricycle, of one or more gear-wheels engaged with the drive-wheels, driving-gears located upon shafts extending parallel with said axle, lever-and-clutch mechanism for giving a rotary motion to said shafts and driving-gears, a cross arm or bar engaged with the steering-wheel support, and sliding bars or rods engaged with the extremities of said cross arm or bar and adapted to be operated by the feet of the rider to guide the vehicle, substantially as described.

7. In a tricycle, the combination, with the frame and drive-wheels, of a seat provided with elastic supports curved inwardly below their points of attachment to said seat and curved outwardly at their lower ends and engaged with the frame immediately in front of the axis of said drive-wheels, substantially as described.

In testimony that I claim the foregoing I have hereunto set my hand, at Milwaukee, in the county of Milwaukee and State of Wisconsin, in the presence of two witnesses.

ANDREW HUNTER.

Witnesses:
JOHN E. WILES,
N. E. OLIPHANT.